(12) United States Patent
Arita

(10) Patent No.: US 7,023,990 B1
(45) Date of Patent: Apr. 4, 2006

(54) SECURE PARAMETER GENERATING DEVICE AND PARAMETER GENERATING METHOD IN ALGEBRAIC CURVE CRYTOGRAPHY

(75) Inventor: Seigo Arita, Tokyo (JP)

(73) Assignee: NEC Corporation, Tokyo (JP)

( * ) Notice: Subject to any disclaimer, the term of this patent is extended or adjusted under 35 U.S.C. 154(b) by 1046 days.

(21) Appl. No.: 09/645,588

(22) Filed: Aug. 25, 2000

(30) Foreign Application Priority Data

Aug. 27, 1999 (JP) .................................. 11-242075

(51) Int. Cl.
*H04K 1/00* (2006.01)
*H04L 9/00* (2006.01)
(52) U.S. Cl. ............................. 380/28; 380/30; 380/44; 380/45; 380/46; 380/47; 380/277
(58) Field of Classification Search .................. 380/28, 380/30, 44, 45, 46, 47, 277; 708/491, 492
See application file for complete search history.

(56) References Cited

U.S. PATENT DOCUMENTS 6,560,336 B1 * 5/2003 Arita ........................... 380/28

FOREIGN PATENT DOCUMENTS

JP 6-282226 10/1994

OTHER PUBLICATIONS

"Efficient algorithms for the Jacobian variety of hyperelliptic curves Y+2=X+p−x+1 over a finite field of odd characteristic p", Duursma et al. Mar. 1999.*
"Sitckelberger elements and modular parametrization of elliptic curves", Stevens, Glenn, Inventiones mathematicae, Volumne 98; pp. 75-106, 1989.*
An addition Algorith in Jacobian of C34 curve, Seigo Arita.*
Addition in the Jacobian of a curve over a finite field, Emil J. Volcheck, Jun. 1995.*
On The performance of Hyperelliptic Crytosystems, Nigel P Smart Sep., 1998.*
Rene Schoof, "Counting points on elliptic curves over finite fields", Journal de Theorie des Nombres de Bordeaux, 7 (1995), pp. 219-254.
Arita et al., "A Software Implementation of Discrete-log-based Cryptosystems with $C_{ab}$ Curve", Security Symposium on Cryptography and Information, (1999) pp. 573-578.

* cited by examiner

*Primary Examiner*—Kim Vu
*Assistant Examiner*—Beemnet W Dada
(74) *Attorney, Agent, or Firm*—Foley & Lardner LLP

(57) ABSTRACT

The Stickelberger element computing device computes a Stickelberger element ω in an ab cyclotomic; the Jacobian addition candidate value computing device computes the Jacobian addition candidate value j and a prime number p corresponding to the Jacobian addition candidate value j, based on the prime number a, the prime number b, the size n of an encryption key, and the Stickelberger elementω; the order candidate value computing device computes a class H consisting of a plurality of candidate values for the order of the Jacobian group of an algebraic curve, based on the prime number a, the prime number b, and the Jacobian addition candidate value j; the security judging device searches for a candidate value h meeting a security condition such as almost prime number characteristic from the class H; and the parameter deciding device computes a parameter of an algebraic curve whose order of the Jacobian group is in accord with the candidate value h, of the algebraic curves specified by the prime number a, the prime number b, and the prime number p.

39 Claims, 6 Drawing Sheets

US 7,023,990 B1

SECURE PARAMETER GENERATING DEVICE AND PARAMETER GENERATING METHOD IN ALGEBRAIC CURVE CRYTOGRAPHY

BACKGROUNDS OF THE INVENTION

1. Field of the Invention

The present invention relates to a secure parameter generating device, a generating method, and a storing medium in a discrete logarithm cryptography (hereinafter, referred to an algebraic curve cryptography), and more particularly to a secure parameter generating device and its generating method in a discrete logarithm cryptography using Jacobian group of algebraic curve.

2. Description of the Related Art

A discrete logarithm cryptography is a public key system based on the difficulty of a discrete logarithm problem on a given finite field. In order to keep the security of cryptography, the order of the finite field must be almost a prime number, that is, a factor of small integer and large integer. The algebraic curve cryptography that is one of the discrete logarithm cryptography needs to use an algebraic curve such that the order of the Jacobian group is almost a prime number.

In the case of an elliptic curve that is the simplest algebraic curve, an efficient algorithm of calculating the order of the Jacobian group over any elliptic curve is known. The detailed description is shown in, for example, "Counting points on elliptic curves over finite fields", Journal de Theorie des Nombres, de Bordeaux 7 (1995), 219–254, Institute de Mathematique de Bordeaux, written by Rene Schoof. The elliptic curve such that the order of the Jacobian group is almost a prime factor can be obtained as follows, by using the above algorithm.

1. Generate a random elliptic curve E.
2. Calculate the order n of the Jacobian group of E.
3. If n is almost a prime number, output E; otherwise, return to 1.

In the case of an algebraic curve other than an elliptic curve, no efficient algorithm of calculating the order of the Jacobian group is known except for one hyper-elliptic curve. Therefore, the algebraic curve which can be used in the algebraic curve cryptography is limited to an elliptic curve or one exceptional hyper elliptic curve.

As for the h-fold operation of the elements in the Jacobian group, "Software Installation of Discrete Logarithm Cryptography Using $C_{ab}$ curve" written by Arita, Yoshikawa, and Miyauchi, pp. 573–578, Security Symposium on Cryptography and Information in 1999, is known.

Further, the technique disclosed in Japanese Patent Publication Laid-Open (Kokai) No. Heisei 6-282226 comprises a step of selecting any prime number, storing an encryption key corresponding to the prime number into the public file device, generating a decoding key list corresponding to the prime number and the encryption key, and storing the decoding key list together with the prime number into a decoder, wherein an encoder obtains a public key of a receiver (decoder) from the public file, to multiply the plaintext on an elliptic curve, its value is sent to the decoder as a cryptogram, and the decoder computes a parameter of the elliptic curve from the cryptogram and selects a decoding key corresponding to the parameter by use of the decoding key list, thereby obtaining the plaintext from the value obtained by multiplying the cryptogram by the elliptic curve, using Chinese residue theorem.

The above mentioned conventional technique limits the usable algebraic curves to an elliptic curve or one of exceptional hyper-elliptic curve. Since the elliptic curve and the hyper-elliptic curve are extremely particular algebraic curve from the viewpoint of the whole algebraic curves and this narrows the target for cryptanalysis, there arises a security problem of an algebraic curve cryptography.

SUMMARY OF THE INVENTION

An object of the present invention is to make it possible to use a higher and complicated algebraic curve which couldn't be used, for an algebraic curve cryptography, and to provide a secure parameter generating device in an algebraic curve cryptography for improving the security of the algebraic curve cryptography.

Further, another object of the present invention is to make it possible to use a higher and complicated algebraic curve which couldn't be used, for an algebraic curve cryptography, and to provide a secure parameter generating method in the algebraic cryptography for improving the security of the algebraic curve cryptography.

According to the first aspect of the invention, a secure parameter generating device in an algebraic curve cryptography, comprises an input means for receiving two different prime numbers (a, b) specifying degree of complexity of a curve and size (n) of an encryption key to be used, a Stickelberger element computing device for computing a Stickelberger element ($\omega$) in an ab cyclotomic, based on the prime number (a) and the prime number (b), a Jacobian addition candidate value computing device for computing Jacobian addition candidate value j corresponding to the two different prime numbers a and b, and a prime number p corresponding to the Jacobian addition candidate value j, based on the prime number (a), the prime number (b), the size (n) of an encryption key, and the Stickelberger element (c), an order candidate value computing device for computing a class H consisting of a plurality of candidate values for order of a Jacobian group of an algebraic curve specified by the prime number a and the prime number b, based on the prime number a, the prime number b, and the Jacobian addition candidate value j, a security judging device for searching for a candidate value h meeting a security condition such as almost prime number characteristic from the class H, according to the class H, a parameter deciding device for computing a parameter of an algebraic curve whose order of the Jacobian group is in accord with the candidate value h, of the algebraic curves specified by the prime number a, the prime number b, and the prime number p, based on the prime number a, the prime number b, the prime number p, and the candidate value h, and an output device for supplying the parameter of the algebraic curve computed by said parameter deciding device.

In the preferred construction, a secure parameter generating device in an algebraic curve cryptography further comprises an a-storing means, a b-storing means, and an n-storing means for respectively storing the prime number a, the prime number b, and the size n of the encryption key received by said input means, a ω-storing means for storing a Stickelberger element ω computed by said Stickelberger element computing device, a p-storing means and a j-storing means for respectively storing the prime number p and the Jacobian addition candidate value j computed by said Jacobian addition candidate value computing device, an H-storing means for storing the class H computed by said order candidate value computing device, and an h-storing means for storing the candidate value h found by said security judging device.

In another preferred construction, a secure parameter generating device in an algebraic curve cryptography comprises said Stickelberger element computing device for computing the Stickelberger element ω by use of the equation $\omega=\Sigma_t[<t/a>+<t/b>]\sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b.

In another preferred construction, a secure parameter generating device in an algebraic curve cryptography comprises said Jacobian addition candidate value computing device for generating αat random, which is an algebraic integer γ generating a prime ideal of a cyclotomic K generated by the primitive ab root or 1 and whose absolute norm becomes the prime number p of bit length $2n/(a-1)(b-1)$ or so, based on the prime number a, the prime number b, the size n of the encryption key, and the Stickelberger element ω, and computing the Jacobian addition candidate value j by use of the equation $j=\gamma^\omega$.

In another preferred construction, a secure parameter generating device in an algebraic curve cryptography comprises said Stickelberger element computing device for computing the Stickelberger element ω by use of the equation $\omega=\Sigma_t[<t/a>+<t/b>]\sigma\_\{-t^{-1}\}$ (where, t runs on a typical series of irreducible residue class with ab used as a divisor, $[\lambda]$ indicates the maximum integer not exceeding a rational number $\lambda$, $<\lambda>$indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, and said Jacobian addition candidate value computing device for generating α at random, which is an algebraic integer γ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element ω, and computing the Jacobian addition candidate value j by use of the equation $j=\gamma^\omega$.

In another preferred construction, a secure parameter generating device in an algebraic curve cryptography comprises said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$.

In another preferred construction, a secure parameter generating device in an algebraic curve cryptography comprises said Stickelberger element computing device for computing the Stickelberger element ω by use of the equation $\omega=\Sigma_t[<t/a>+<t/b>]\sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, and said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$.

In another preferred construction, a secure parameter generating device in an algebraic curve cryptography comprises said Jacobian addition candidate value computing device for generating α at random, which is an algebraic integer γ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element ω, and computing the Jacobian addition candidate value j by use of the equation $j=\gamma^\omega$, and said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$is the primitive ab root of 1, based on the prime number a, the prime number b, and the Jacobian addition candidate value j, and computing the class of the candidate values, $H=\{h_1, h_2, \ldots, h_{2ab}\}$.

In another preferred construction, secure parameter generating device in an algebraic curve cryptography comprises said Stickelberger element computing device for computing the Stickelberger element ω by use of the equation $\omega=\Sigma_t[<t/a>+<t/b>]\sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said Jacobian addition candidate value computing device for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j=\gamma^\omega$, and said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1, h_2, \ldots, h_{2ab}\}$.

In another preferred construction, a secure parameter generating device in an algebraic curve cryptography comprises said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Stickelberger element computing device for computing the Stickelberger element ω by use of the equation $\omega = \Sigma_t [<t/a> + <t/b>]\sigma_{-}\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\sigma_t$ indicates Galois mapping $\zeta \to \zeta^t$ in the ab cyclotomic (ζ is the primitive ab root of 1)), based on the prime number a and the prime number b, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Jacobian addition candidate value computing device for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j=\gamma^\omega$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Stickelberger element computing device for computing the Stickelberger element ω by use of the equation $\omega = \Sigma_t [<t/a> + <t/b>]\sigma_{-}\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\sigma_t$ indicates Galois mapping $\zeta \to \zeta^t$ in the ab cyclotomic ($\zeta$ is the primitive ab root of 1)), based on the prime number a and the prime number b, said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Stickelberger element computing device for computing the Stickelberger element $\omega$ by use of the equation $\omega = \Sigma_t [<t/a>+<t/b>] \sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm\_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$, said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm\_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating device in an algebraic curve cryptography comprises said Stickelberger element computing device for computing the Stickelberger element $\omega$ by use of the equation $\omega = \Sigma_t [<t/a>+<t/b>] \sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element a, and computing the Jacobian addition candidate value j by use of the equation $j=\gamma^\omega$, said order candidate value computing device for computing a candidate value $h_k$ for the order of the Jacobian group of an algebraic curve specified by the parameters a and b, using the equation $h_k = \text{Norm}_{K|Q}(1+(-\zeta)^k j)$ (where Norm\_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a{}^l Y^a + \zeta_b{}^m X^b + 1 = 0$, as for each integer l from 1 to a inclusively and each integer m from 1 to b inclusively, computing the h-fold of an element in the Jacobian group indicated by the point G, and supplying p, $\zeta_a{}^l$, and $\zeta_b{}^m$ as the parameter of an algebraic curve whose order of the Jacobian group is in accord with the candidate value h, of the algebraic curves specified by the prime number a and the prime number b if the result is equal to an identity element in the Jacobian group.

According to the second aspect of the invention, a secure parameter generating method in an algebraic curve, comprises the steps of a Stickelberger element computing procedure for computing a Stickelberger element $\omega$ in an ab cyclotomic, respectively based on two different prime numbers a and b specifying degree of complexity of curve, a Jacobian addition candidate value computing procedure for computing Jacobian addition candidate value j corresponding to the two different prime numbers a and b, and a prime number p corresponding to the Jacobian addition candidate value j, respectively based on the prime number a, the prime number b, the size n of an encryption key, and the Stickelberger element $\omega$, an order candidate value computing procedure for computing a class H consisting of a plurality of candidate values for order of a Jacobian group of an algebraic curve specified by the prime number a and the prime number b, respectively based on the prime number a, the prime number b, and the Jacobian addition candidate value j, a security judging procedure for searching for a candidate value h meeting a security condition such as almost prime number characteristic from the class H, according to the class H, and a parameter deciding procedure for computing a parameter of an algebraic curve whose order of the Jacobian group is in accord with the candidate value h, of the algebraic curves specified by the prime number a, the prime number b, and the prime number p, respectively based on the prime number a, the prime number b, the prime number p, and the candidate value h.

In the preferred construction, a secure parameter generating method in an algebraic curve cryptography comprises a procedure for storing a Stickelberger element $\omega$ computed by said Stickelberger element computing procedure into said $\omega$-storing means, a procedure for respectively storing the prime number p and the Jacobian addition candidate value j computed by said Jacobian addition candidate value computing procedure into said p-storing means and j-storing means, a procedure for storing the class H computed by said order candidate value computing procedure into said H-storing means, and a procedure for storing the candidate value h found by said security judging procedure into said h-storing means.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma_{\{-t^{-1}\}}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b.

In another preferred construction, a secure parameter generating method in an algebraic curve cryptography comprises said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma_{\{-t^{-1}\}}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, and said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$.

In another preferred construction, a secure parameter generating method in an algebraic curve cryptography comprises said order candidate value computing procedure for computing a candidate value $h_k$ for the order of the Jacobian group of an algebraic curve specified by the parameters a and b, using the equation $h_k = \text{Norm}_{K|Q}(1 + (-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, and said order candidate value computing procedure for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$.

In another preferred construction, a secure parameter generating method in an algebraic curve cryptography comprises said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$, and said order candidate value computing procedure for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$, and said order candidate value computing procedure for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$.

In another preferred construction, a secure parameter generating method in an algebraic curve cryptography comprises said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^l$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said order candidate value computing procedure for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Stickelberger element computing procedure for computing the Stickelberger element $\omega$ by use of the equation $\omega = \Sigma_t [<t/a> + <t/b>] \sigma\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\sigma_t$ indicates Galois mapping $\zeta \to \zeta^t$ in the ab cyclotomic ($\zeta$ is the primitive ab root of 1)), based on the prime number a and the prime number b, said order candidate value computing procedure for computing a candidate value $h_k$ for the order of the Jacobian group of an algebraic curve specified by the parameters a and b, using the equation $h_k = \text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element ω, and computing the Jacobian addition candidate value j by use of the equation $j=\gamma^\omega$, said order candidate value computing procedure for computing a candidate value $h_k$ for the order of the Jacobian group of an algebraic curve specified by the parameters a and b, using the equation $h_k=\text{Norm}_{K|Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

In another preferred construction, a secure parameter generating method in an algebraic curve cryptography comprises said Stickelberger element computing procedure for computing the Stickelberger element ω by use of the equation $\omega = \Sigma_t[\langle t/a \rangle + \langle t/b \rangle]\sigma_{\{-t^{-1}\}}$ (where, t runs on a typical series of irreducible residue class with ab used as a divisor, [λ] indicates the maximum integer not exceeding a rational number λ, <λ> indicates a fractional portion λ−[λ] of the rational number λ, $\sigma_t$ indicates Galois mapping $\zeta \to \zeta^t$ in the ab cyclotomic (ζ is the primitive ab root of 1)), based on the prime number a and the prime number b, said Jacobian addition candidate value computing procedure for generating α at random, which is an algebraic integer γ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element ω, and computing the Jacobian addition candidate value j by use of the equation $j=\gamma^\omega$, said order candidate value computing procedure for computing a candidate value $h_k$ for the order of the Jacobian group of an algebraic curve specified by the parameters a and b, using the equation $h_k=\text{Norm}_{K|Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1, h_2, \ldots, h_{2ab}\}$, and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^l Y^a + \zeta_b^m X^b + 1 = 0$, as for each integer l from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

According to another aspect of the invention, a computer readable memory storing a program for generating a secure parameter in an algebraic curve cryptography, to run the program on a computer, the program comprises the steps of a Stickelberger element computing procedure for computing a Stickelberger element ω in an ab cyclotomic, respectively based on two different prime numbers a and b specifying degree of complexity of curve, a Jacobian addition candidate value computing procedure for computing Jacobian addition candidate value j corresponding to the two different prime numbers a and b, and a prime number p corresponding to the Jacobian addition candidate value j, respectively based on the prime number a, the prime number b, the size n of an encryption key, and the Stickelberger element ω, an order candidate value computing procedure for computing a class H consisting of a plurality of candidate values for order of a Jacobian group of an algebraic curve specified by the prime number a and the prime number b, respectively based on the prime number a, the prime number b, and the Jacobian addition candidate value j, a security judging procedure for searching for a candidate value h meeting a security condition such as almost prime number characteristic from the class H, according to the class H, and a parameter deciding procedure for computing a parameter of an algebraic curve whose order of the Jacobian group is in accord with the candidate value h, of the algebraic curves specified by the prime number a, the prime number b, and the prime number p, respectively based on the prime number a, the prime number b, the prime number p, and the candidate value h.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
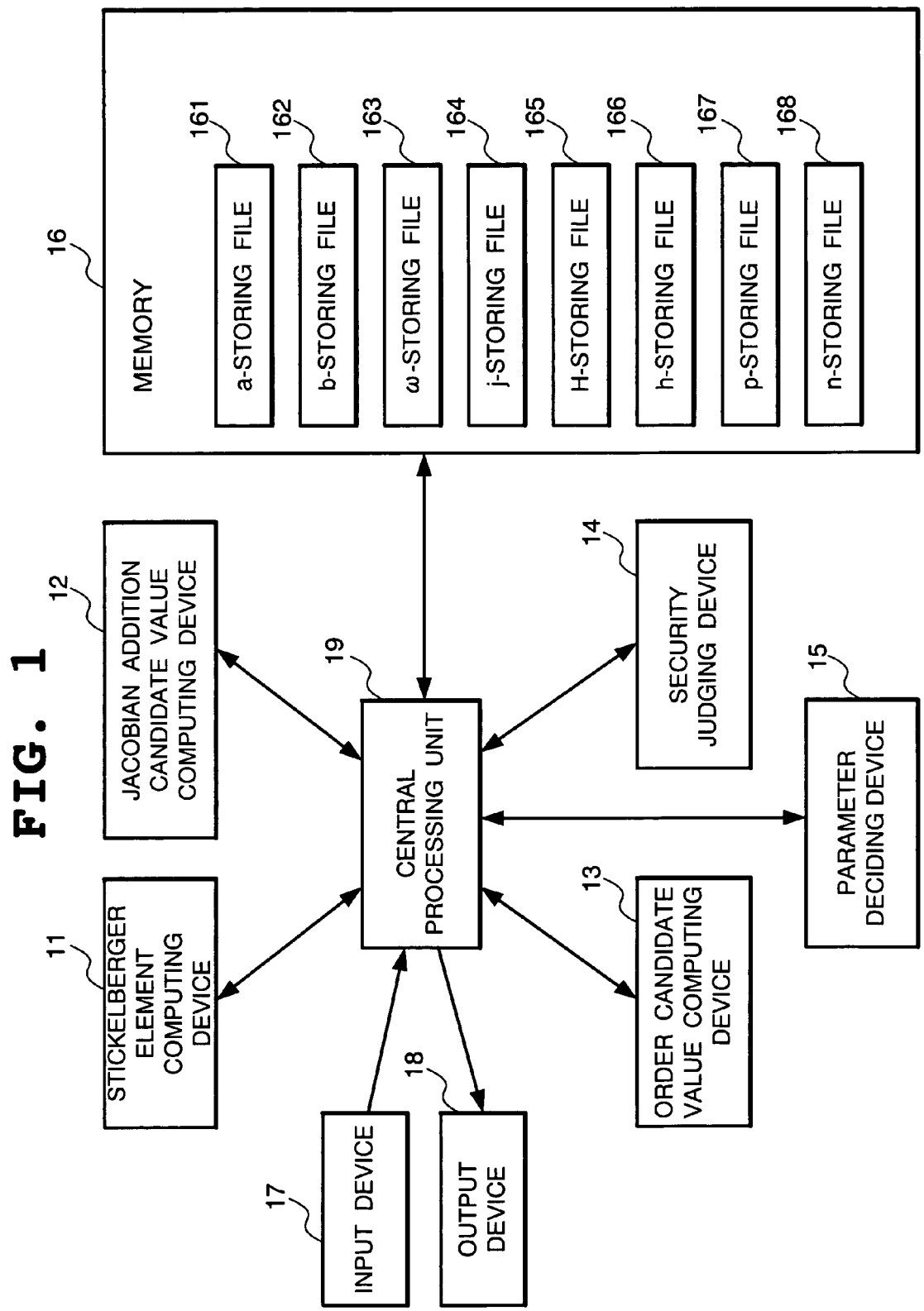
FIG. 1 is a block diagram showing the form of the first embodiment according to the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First, the principle of the present invention will be described.

The present invention is to efficiently search for an algebraic curve such that the order of the Jacobian group is almost a prime number, from the class of an algebraic curve having the definition expression such as $\alpha Y^a + \beta X^b + 1 = 0$, and to make it possible to use a higher and complicated algebraic curve that couldn't be used, for an algebraic curve cryptography. Here, the parameters a and b indicate the degree of complexity of curves.

The algebraic curve over a finite field $F_q$ of the order q, which has the definition expression such as $\alpha Y^a + \beta X^b + 1 = 0$, is defined as $C(q, \alpha, \beta)$. As for the algebraic curve $C(q, \alpha, \beta)$, the order of the Jacobian group can be designed using the description about its L function by use of the Jacobian addition.

Hereafter, for brief description, assume that q:=p (p is expressed by q) is a prime number, and that the expression, p≡1 mod LCM(a, b) is satisfied (LCM is the least common multiple). Further, the primitive ab root of 1 is defined as $\zeta$. The prime number p is completely factorized into m pieces of prime ideals, $P_1, P_2, \ldots, P_m$ in a cyclotomic $Q(\zeta)$. Here, the number m is the number of irreducible residue classes of the divisor ab.

The generator w of the multiplication group $F_p^*$ of the finite field $F_p$ is fixed, and the index $\chi_s$ of $F_p^*$, as for the rational number such that (p−1)s becomes an integer, is defined as $\chi_s(w) = \exp(2\pi i s)$ (where i is an imaginary number). Assuming that $\chi_s(0) = 0$ (s: when it is not an integer), =1 (s: when it is an integer), the domain is expanded on the whole $F_p$. As for the integer l=1, 2, ..., a−1 and the integer m=1, 2, ..., b−1, the expression, $j_p(l, m) = \Sigma_{\{1+v_1+v_2=0\}} \chi_{l/a}(v_1) \chi_{m/b}(v_2)$ is called as Jacobian addition. Where, $v_1$ and $v_2$ run on $v_1, v_2 \in F_p$ meeting the equation $1+v_1+v_2 = 0$. At this time, it is well known that the L function $L_p(U)$ of $C(p, \alpha, \beta)$ can be expressed by using the Jacobian addition as follows.

$L_p(U) = \pi_{l=1, 2, \ldots a-1, m=1, 2 \ldots b-1}(1 + \chi_{l/a}(\alpha^{-1})\chi_{m/b}(\beta^{-1}) j_p(l, m) U)$. Therefore, the order h of the Jacobian group of $C(p, \alpha, \beta)$ is given by $h = L_p(1) = \pi_{l=1, 2, \ldots, a-1, m=1, 2, \ldots, b-1}(1 + \chi_{l/a}(\alpha^{-1}) \chi_{m/b}(\beta^{-1}) j_p(l, m))$. It is necessary to calculate the Jacobian addition $j_p(l, m)$, in order to require the order of the Jacobian group. However, since it is impossible to directly calculate the Jacobian addition $j_p(l, m)$ according to the definition expression, from the viewpoint of the volume of calculation, the Stickelberger element as for the following Jacobian addition is used.

Assume that $[\lambda]$ indicates the maximum integer not exceeding the rational number $\lambda$ and that $<\lambda>$ indicates the fraction part $\lambda - [\lambda]$ of the rational number $\lambda$. Further, assume that $\sigma_t$ indicates the Galois mapping $\zeta \to \zeta^t$ of the cyclotomic field $Q(\zeta)$. The Stickelberger element $\omega(a, b)$ that is the generator of the group ring $Z[Gal(Q(\zeta)|Q)]$ is defined as $\omega(a, b) = \Sigma_t[<t/a> + <t/b>]\sigma_{-t}^{-1}$. Where, t runs on the typical series of the irreducible residue class with the divisor ab.

It is well known that the expression $(j_p(l, m)) = p^{\omega(a, b)}$ is satisfied as the ideal of the cyclotomic field $Q(\zeta)$. Where, P is the prime ideal on p. By the above expression, $j_p(l, m)$ is necessarily resolved except for the 2ab root of 1. Of the results, the degree of freedom for ab root can be obtained by the degree of freedom of the coefficient $\alpha, \beta \in F_q$ of $C(p, \alpha, \beta)$.

In these ways, the search algorithm of the following secure curve $C(p, \alpha, \beta)$ can be obtained. The search algorithm of the secure curve $C(p, \alpha, \beta)$ input: the number of Jacobian bits n
output: p, α, β
(1) g←(a−1)(b−1)/2
(2) The candidate j of the Jacobian addition as for the prime number p of some n/g bit or the like is searched for by using the calculation algorithm of the candidate value of the Jacobian addition as described later: (p, j)←{calculation algorithm of the candidate value of the Jacobian addition}(n/g).
(3) as for the respective k=0, 1, ..., ab, $h_k \leftarrow \pi_{l=1, 2, \ldots, a-1, m=1, 2, \ldots, b-1}(1+(-\zeta)^k j)$
(4) Check whether there is an almost prime number $h_k$ in $\{h_0, h_1, \ldots, h_{ab}\}$. If there is none, return to (1). If there is, h:=$h_k$ is defined.
(5) The symbols $\zeta_a, \zeta_b$ are respectively defined as a-root of 1 and b-root of 1 in $F_p$. Check whether the order of the Jacobian group of the curve $C(p, \zeta_a^1, \zeta_b^m): \zeta_a^1 y^a + \zeta_b^m x^b + 1 = 0$ is equal to h, as for the respective l=0, 1, ..., a−1 and the respective m=0, 1, ..., b−1. If it is equal, output p, $\alpha = \zeta_a^{-1}, \beta = \zeta_b^m$ and finish the operation. If such l and m don't exist, return to (2).

In the calculation algorithm of the candidate value of the Jacobian addition used in the above, the candidate value of the Jacobian addition is required by using the above-mentioned Stickelberger element $\omega(a, b) = \Sigma_t[<t/a> + <t/b>]\sigma_{-t}^{-1}$.

The calculation algorithm of the candidate value of the Jacobian addition is as follows.
input: the number of bits m,
output: p, j,
(1) $\omega \leftarrow \Sigma_t(<t/a> + <t/b>)\sigma_{-t}^{-1}$,
(2) Generate $\gamma_0 = \Sigma_{l=0}^{m-1} c_l \zeta^l$ (−10<$c_l$<10) at random.
(3) as for the respective i=1, 2, ...,
γ←$\gamma_0$+I,
p←$Norm_{Q(\zeta)|Q}(\gamma)$,
Is p smaller than m bit or so?
yes→continue,
Is p larger than m bit or so?
yes→to (2),
Is p a prime number?
no→continue,
(4) Output j←$\gamma^\omega$, p and j, and finish.

This time, the form of the first embodiment of the present invention will be described with reference to the accompanying drawings. FIG. 1 is a block diagram showing the form of the first embodiment.

With reference to FIG. 1, the form of the first embodiment of the present invention comprises a Stickelberger element computing device 11, a Jacobian addition candidate value computing device 12, an order candidate value computing device 13, a security judging device 14, a parameter deciding device 15, a memory 16, an input device 17, an output device 18, and a central processing unit 19.

The memory 16 includes a a-storing file 161, a b-storing file 162, a ω-storing file 163, a j-storing file 164, an H-storing file 165, an h-storing file 166, a p-storing file 167, and an n-storing file 168.

Hereinafter, assume that a known method is used for the norm arithmetic $N_{Q(\zeta)|Q}$ and four fundamental arithmetic rules of algebraic number in the cyclotomic field $Q(\zeta)$, arithmetic of the function of the Galois group $G(Q(\zeta)|Q)$ for the cyclotomic field $Q(\zeta)$, and addition and multiplication in the group ring $Z[G(Q(\zeta)|Q)]$ on the Galois group $G(Q(\zeta)|Q)$ of the integer ring Z coefficient.

The operation of the form of a first embodiment according to the present invention will be described this time.

Figure 2:
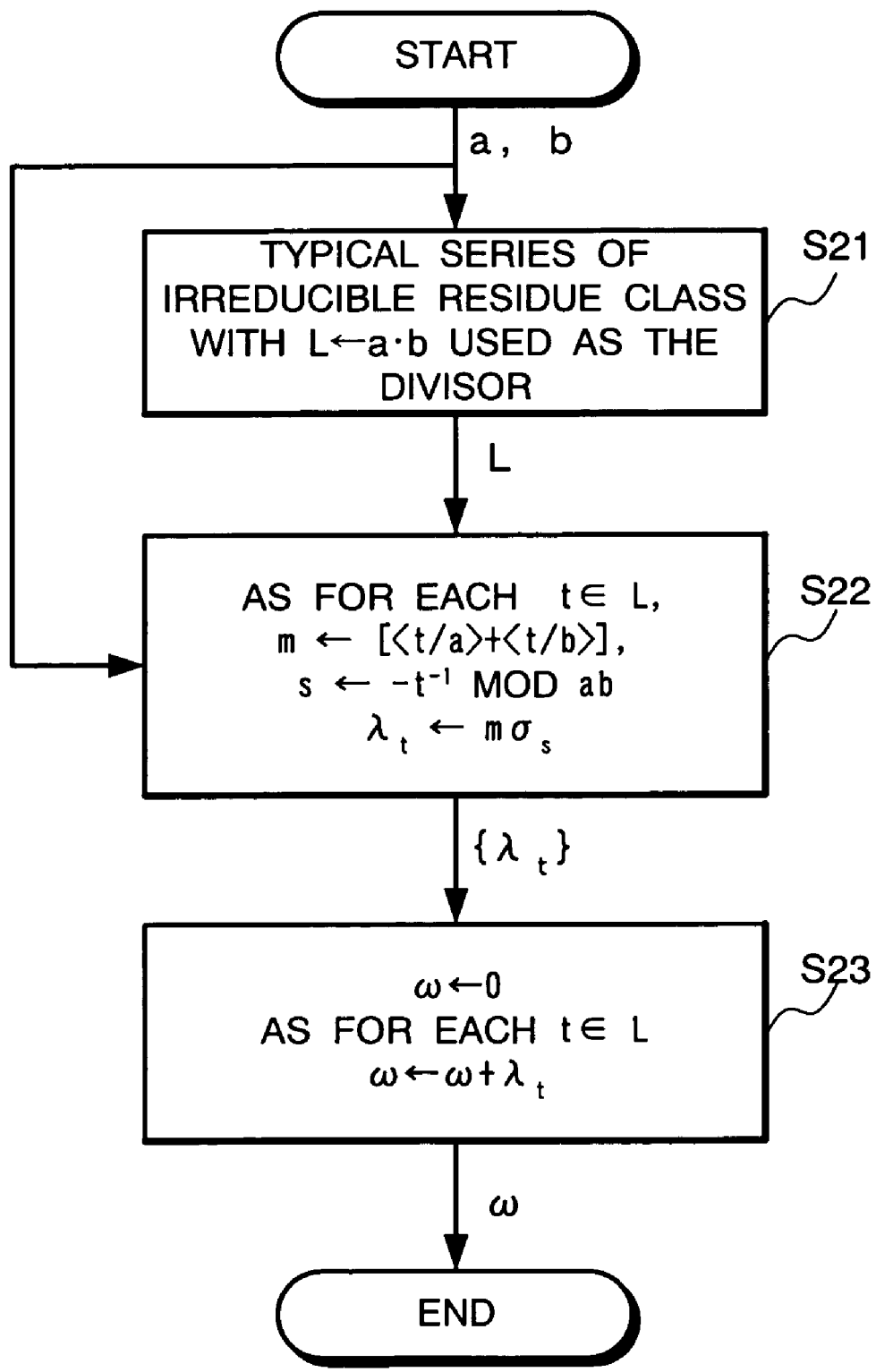
FIG. 2 is a flow chart showing the operation of a Stickelberger element computing device.
Figure 3:
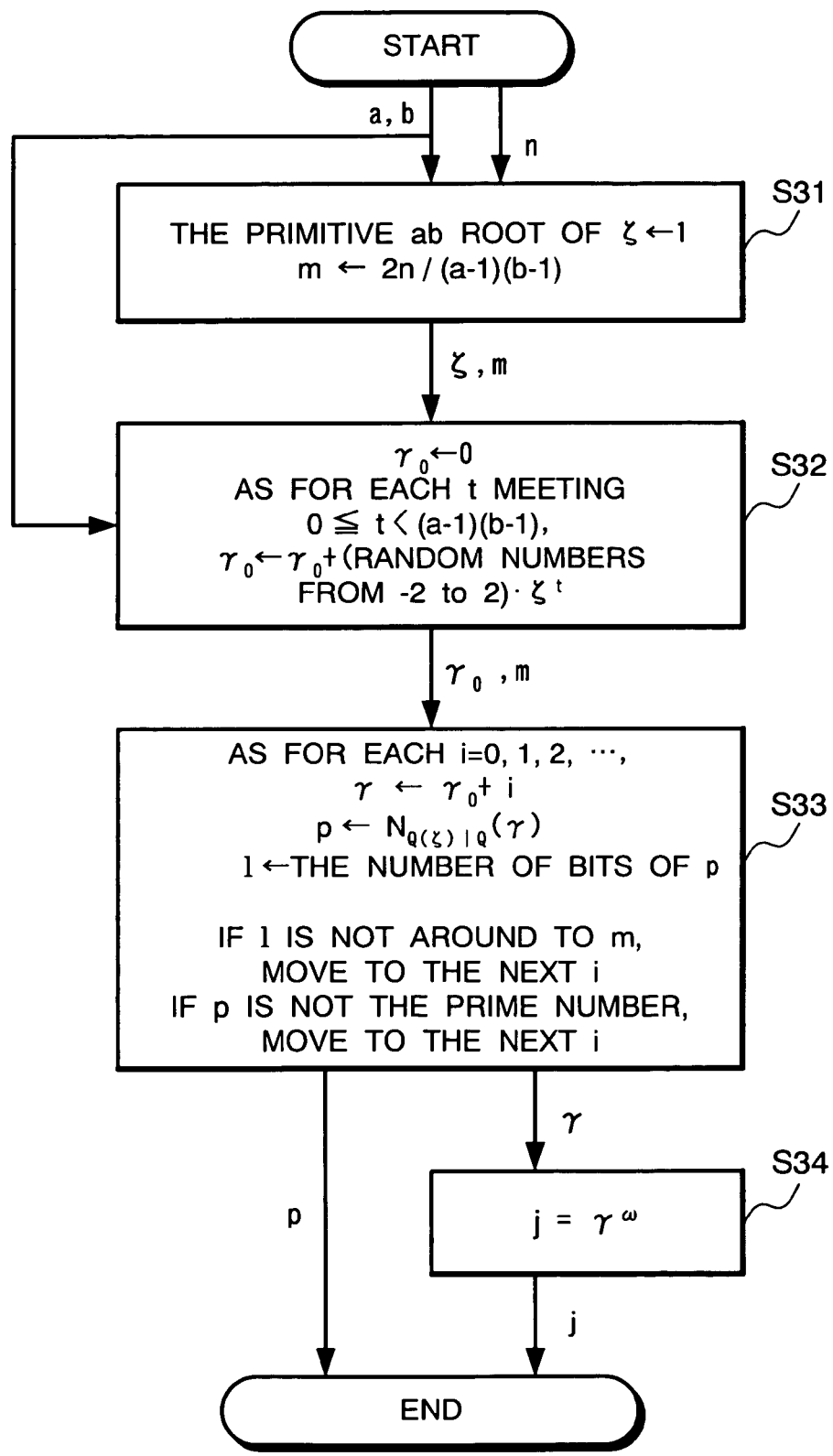
FIG. 3 is a flow chart showing an operation of the Jacobian additive candidate value computing device.
Figure 4:
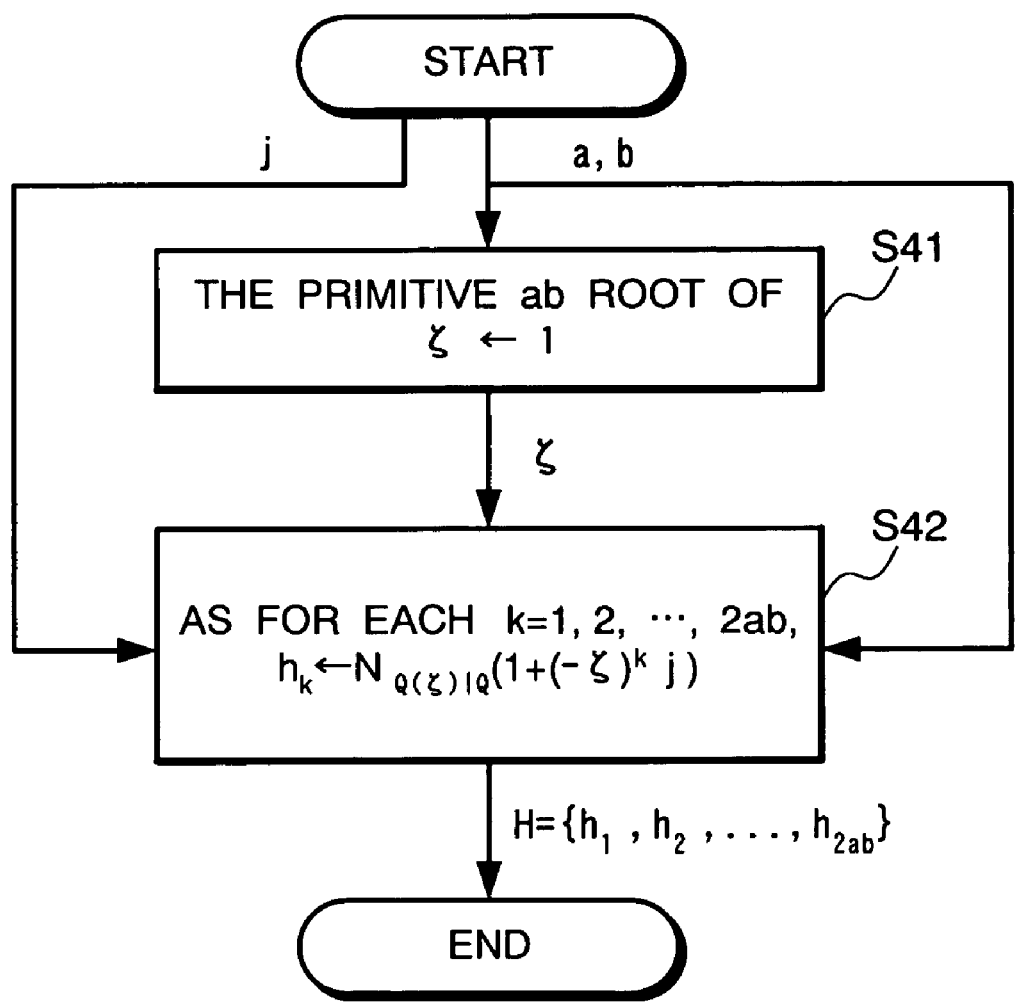
FIG. 4 is a flow chart showing the operation of the order candidate value computing device.
Figure 5:
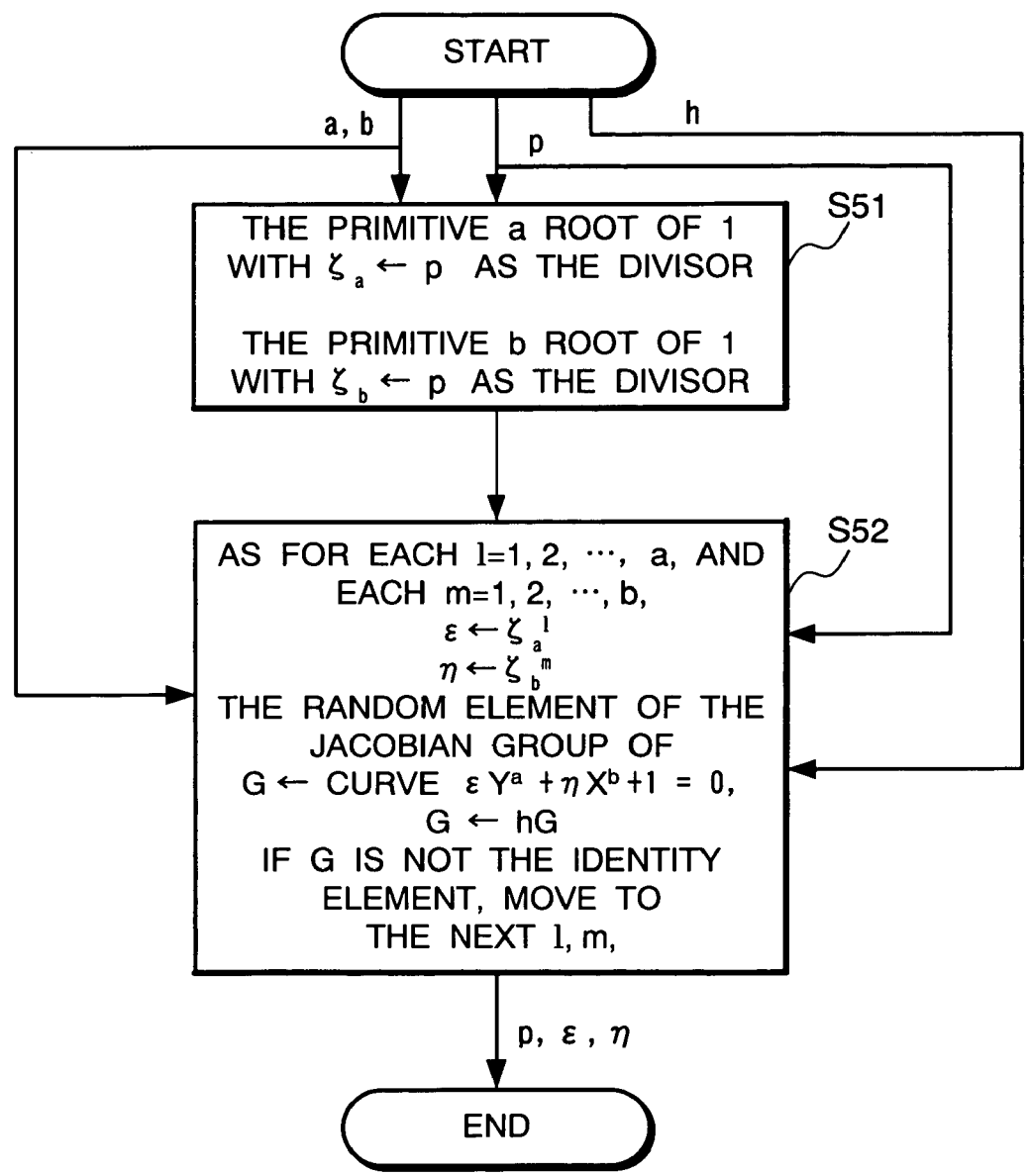
FIG. 5 is a flow chart showing the parameter deciding device.

FIG. 2 is a flow chart showing the operation of the Stickelberger element computing device 11. FIG. 3 is a flow chart showing the operation of the Jacobian addition candidate value computing device 12. FIG. 4 is a flow chart showing the operation of the order candidate value computing device 13. FIG. 5 is a flow chart showing the operation of the parameter deciding device 15.

The description will be made in the case where two different prime numbers, a=3, b=7, specifying the degree of complexity of a curve, and the size n=160 of an encryption key to be used are supplied from the input device 17. The supplied a and b are temporarily stored in the a-storing file 161 and the b-storing file 162 respectively, through the central processing unit 19. Further, a variable found in the following description is stored in the memory 16.

The Stickelberger element computing device 11 obtains a=3, b=7 from the a-storing file 161 and the b-storing file 162, according to the operation as shown in FIG. 2, and operates as follows.

A typical series {1, 2, 4, 5, 8, 10, 11, 13, 16, 17, 19, 20} of the irreducible residue class with a·b=3×7=21 used for the variable L as the divisor is stored in Step S21 of FIG. 2.

As for the respective integers t included in the variable L={1, 2, 4, 5, 8, 10, 11, 13, 16, 17, 19, 20} in Step 22 of FIG. 2, for example, as for t=1, since [<1/3>+<1/7>]=[1/3+1/7]=[10/21]=0, 0 is stored in the variable m; since $-1^{-1} \equiv -1 \equiv 20$ mod 21, 20 is stored in the variable s; since $0 \times \sigma_{20}=0$, 0 is stored in the variable $\lambda_1$.

As for the other t, since [<2/3>+<2/7>]=[2/3+2/7]=[20/21]=0, 0 is stored in the variable $\lambda_2$; since [<4/3>+<4/7>]=[1/3+4/7]=[19/21]=0, 0 is stored in the variable $\lambda_4$; since [<5/3>+<5/7>]=[2/3+5/7]=[29/21]=1 and $(-5)^{-1} \equiv 16^{-1} \equiv 4$ mod 21, $\sigma_4$ is stored in the variable $\lambda_5$; since [<8/3>+<8/7>]=[2/3+1/7]=[17/21]=0, 0 is stored in the variable $\lambda_8$; since [<10/3>+<10/7>]=[1/3+3/7]=[16/21]=0, 0 is stored in the variable $\lambda_{10}$; since [<11/3>+<11/7>]=[2/3+4/7]=[26/21]=1 and $(-11)^{-1} \equiv 10^{-1} \equiv 19$ mod 21, $\sigma_{19}$ is stored in the variable $\lambda_{11}$; since [<13/3>+<13/7>]=[1/3+6/7]=[25/21]=1 and $(-13)^{-1} \equiv 8^{-1} \equiv 8$ mod 21, $\sigma_8$ is stored in the variable $\lambda_{13}$; since [<16/3>+<16/7>]=[1/3+2/7]=[13/21]=0, 0 is stored in the variable $\lambda_{16}$; since [<17/3>+<17/7>]=[2/3+3/7]=[23/21]=1 and $(-17)^{-1} \equiv 4^{-1} \equiv 16$ mod 21, $\sigma_{16}$ is stored in the variable $\lambda_{17}$; since [<19/3>+<19/7>]=[1/3+5/7]=[22/21]=1 and $(-19)^{-1} \equiv 2^{-1} \equiv 11$ mod 21, $\sigma_{11}$ is stored in the variable $\lambda_{19}$; and since [<20/3>+<20/7>]=[2/3+6/7]=[32/21]=1 and $(-20)^{-1} \equiv 1^{-1} \equiv 1$ mod 21, $\sigma_1$ is stored in the variable $\lambda_{20}$, in the same way.

The total $\omega = \sigma_4 + \sigma_{19} + \sigma_8 + \sigma_{16} + \sigma_{11} + \sigma_1$ of the whole data stored in the respective variables $\lambda_1, \lambda_2, \lambda_4, \lambda_5, \lambda_8, \lambda_{10}, \lambda_{11}, \lambda_{13}, \lambda_{16}, \lambda_{17}, \lambda_{19}, \lambda_{20}$ is computed in Step S23 of FIG. 2. Here, the total means the total in the group ring $Z[G(Q(\zeta)|Q)]$, indicating the total of the coefficients of the respective $\sigma_i$ with the respective $\sigma_i$ regarded as symbols. The arithmetic result ω is temporarily stored in the ω-storing file 163 through the central processing unit 19.

The Jacobian addition candidate value computing device 12 obtains a=3, b=7, n=160, $\omega = \sigma_4 + \sigma_{19} + \sigma_8 + \sigma_{16} + \sigma_{11} + \sigma_1$ from the a-storing file 161, the b-storing file 162, the n-storing file 168, and the ω-storing file 163 and computes the candidate value j of the Jacobian addition, according to the processing as shown in FIG. 3, as follows.

Since ab=21, the primitive 21$^{st}$ power root of 1 is stored in the variable ζ, and since 2n/(a−1)(b−1)=26.6 . . . , 27 is stored in the variable m, in Step 31 of FIG. 3.

The random integer of the cyclotomic field $Q(\zeta)$ is stored in the variable $\gamma_0$ as follow, in Step S32 of FIG. 3. The variable $\gamma_0$ is initialized to 0; the random number $r_0=-2$ is generated as for t=0, $r_0\zeta^0=-2$ is added to $\gamma_0$, so to require $\gamma_0=-2$; the random number $r_1=2$ is generated as for t=1, $r_1\zeta^1=2\zeta$ is added to $\gamma_0$, so to require $\gamma_0=-2+2\zeta$; and the same operation is repeated until t=11, so to require $\gamma_0=-2+2\zeta-\zeta^2+2\zeta^3+2\zeta^5-\zeta^6-\zeta^7-2\zeta^8+2\zeta^9-\zeta^{11}$, in Step S32 of FIG. 3.

The following operation will be performed on the respective integers i=0, 1, 2, . . . , in Step S33 of FIG. 3. As for i=0, $\gamma_0+0$ is stored in the variable γ, so to obtain $\gamma=-2+2\zeta-\zeta^2+2\zeta^3+2\zeta^5-\zeta^6-\zeta^7-2\zeta^8+2\zeta^9-\zeta^{11}$, to compute the norm $N_{Q(\zeta)|Q}(\gamma)$. The resultant 129571513 is stored in the p-storing file 167, the number of bits 29 of p=129571513 is stored in the variable 1. That 1=29 and m=27 or so is confirmed. When p=129571513 is factorized into prime factors in the known way, p=129571513=43×211×14281 is obtained. Since p=129571513 is not a prime number, the operation as for i=0 is finished, and as for i=1, the same operation will be repeated. In the form of this embodiment, the same operation is continued until i=2. As for i=2, $\gamma_0+2$ is stored in the variable γ, so to obtain $\gamma=2\zeta-\zeta^2+2\zeta^3+2\zeta^5-\zeta^6-\zeta^7-2\zeta^8+2\zeta^9-\zeta^{11}$, to compute the norm $N_{Q(\zeta)|Q}(\gamma)$. The resultant 163255597 is stored in the p-storing file 167, and the number of bits 28 of p=163255597 is stored in the variable 1. Since 1=28 and m=27 or so, and p=163255597 is determined as a prime number (a known method is used for judgment of a prime number), the operation of Step S33 will be finished.

In Step S34 of FIG. 3, the Stickelberger element $\omega = \sigma_4 + \sigma_{19} + \sigma_8 + \sigma_{16} + \sigma_{11} + \sigma_1$ is adopted to work on the value $2\zeta-\zeta^2+2\zeta^3+2\zeta^5-\zeta^6-\zeta^7-2\zeta^8+2\zeta^9-\zeta^{11}$ of the variable γ and the result is stored in the j-storing file 164.

Namely, since $j = \sigma_4(\gamma)\sigma_{19}(\gamma)\sigma_8(\gamma)\sigma_{16}(\gamma)\sigma_{11}(\gamma)\sigma_1(\gamma) = -11346+4158\zeta+9337\zeta^2-10930\zeta^3+3060\zeta^4+11132\zeta^5-1408\zeta^6-10000\zeta^7+7506\zeta^8+1237\zeta^9-9894\zeta^{10}+16406\zeta^{11}$, the content of the j-storing file 164 becomes $-11346+4158\zeta+9337\zeta^2-10930\zeta^3+3060\zeta^4+11132\zeta^5-1408\zeta^6-10000\zeta^7+7506\zeta^8+1237\zeta^9-9894\zeta^{10}+16406\zeta^{11}$.

The order candidate value computing device 13 obtains a, b, j respectively from the a-storing file 161, the b-storing file 162, and the j-storing file 164, according to the processing as shown in FIG. 4, and computes each candidate value for the order of the Jacobian group, as follows.

Since ab=21, the primitive 21$^{st}$ power root of 1 is stored in the variable ζ, in Step S41 of FIG. 4.

In Step S42 of FIG. 4, $N_{Q(\zeta)|Q}(1+(-\zeta)^k j)$ is computed as for the respective integers k=1, . . . , 2ab=42, by using the Jacobian addition candidate value j, and the result is stored in the variable $h_k$. Namely, since $N_{Q(\zeta)|Q}(1+(-\zeta)j)=1894575055422467486272091737921405096874954 7249577$ as for k=1, 18945750554224674862720917379214050968749547249577 is stored in the variable $h_1$, and since $N_{Q(\zeta)|Q}(1+(-\zeta)^2 j)=18928969305265796978830941938772180777$ 050417721949 as for k=2, 189289693052657969788309 4193877218077050417721949 is stored in the variable $h_2$.

Hereinafter, in the same way, 1893944239775755963917658612840438347907614213576 1 is stored in the variable $h_3$; 18935060345406437247984249590121980321244862 496761 is stored in the variable $h_4$; 18935622676852726684 4902816970612470237474541809664 is stored in the variable $h_5$; 189319369036657054755816473055744447862632 37069081 is stored in the variable $h_6$; 18929560654 77186010138331818599767411692962601288 9 is stored in the variable $h_7$; 189391502036502501861663152421263 55786799280592469 is stored in the variable $h_8$; 18932 675807273674693936115572103379669380378369473 is stored in the variable $h_9$; 189423099658214054149706149 9 2239749691042375170033 is stored in the variable $h_{10}$; 18934229290635176830764035532046510839791719442 389 is stored in the variable $h_{11}$; 189358341725886030265 0 880751496165360343196829336 9 is stored in the variable $h_{12}$; 18938078743053945947831932134835899678969080 710281 is stored in the variable $h_{13}$; 18930980854 11469852119769234110782679684022536846 1 is stored in the variable $h_{14}$; 18925926348482126046797408190 9 51930473609373791353 is stored in the variable $h_{15}$; 189362297243143383276081559991934644929132184596 33 is stored in the variable $h_{16}$; 1893538909827848749 520574028505281217094387882325 3 is stored in the variable $h_{17}$; 18931691567781542998050896522571358 0 2737 4445665073 is stored in the variable $h_{18}$; 18932734180 6109261086670360904920771618014571784 9 is stored in the variable $h_{19}$; 189386644117437248158037845937618014615797056 47693 is stored in the variable $h_{20}$; 18933 9427527701051798379894734720806164744232549 69 is stored in the variable $h_{21}$; 18919302986335777367049540 268484273861903106390769 is stored in the variable $h_{22}$; 18936075396885270373787117176518052249740861371 3 621 is stored in the variable $h_{23}$; 189256043289845926 2962746519434319120659416003707 3 is stored in the variable $h_{24}$; 18929984863788418751836156261712299372 0 83231633577 is stored in the variable $h_{25}$; 189294225317 936481701112283397411981500949834997 76 is stored in the variable $h_{26}$; 18933107954541528865152848804062672753166448460761 is stored in the variable $h_{27}$; 189354 83634705487053043563594391048299333735703993 is stored in the variable $h_{28}$; 18925896848340062851972136696783348221127455098349 is stored in the variable $h_{29}$; 18932368490475205159124453933007681555744686326 777 is stored in the variable $h_{30}$; 18922739336864448 742750281538719599103232717642873 is stored in the variable $h_{31}$; 18930815175217344826609492375186423724694014551957 is stored in the variable $h_{32}$; 1892921051 036040622605765937247223088517542107700 9 is stored in the variable $h_{33}$; 1892696732793673017825053788486213781518871814067 3 is stored in the variable $h_{34}$; 18934063763272126450623787600233843527396400812 437 is stored in the variable $h_{35}$; 1893391205597618768010542925068817008854152877010 41 is stored in the variable $h_{36}$; 189288163157106235300894606076087973370818006324 73 is stored in the variable $h_{37}$; 18929656538570982720438072809652072203857571941789 is stored in the variable $h_{38}$; 18933352933862176606331230531189579186007983024249 is stored in the variable $h_{39}$; 1893231 066327499444559974318003207993714768780512 1 is stored in the variable $h_{40}$; 18926381945702726406182624557022344113037957991 709 is stored in the variable $h_{41}$; and 189311026817890950722296762629755773443 1 4266433617 is stored in the variable $h_{42}$, respectively.

Finally, the order candidate value computing device 13 combines the contents of the variables $h_1$ to $h_{42}$ together as H and stores the same into the H-storing file 165.

The security judging device 14 obtains the H from the H-storing file 165, and searches for a candidate value h meeting the security condition of almost prime number characteristic from the order candidate values $h_1, h_2, \ldots, h_{42}$ included in the H, and stores the same into the h-storing file 166. In this form of the embodiment, for brief description, the security condition is considered as for the almost prime number characteristic. By use of the known prime number judging method, $h_{11}$=189342229290635176830764035532046510839791719442389 is judged to be a prime number, and the security judging device 14 stores h=$h_{11}$=189342229290635176830764035532046510839791719442389 into the h-storing file 166.

The parameter deciding device 15 obtains a, b, p, and h respectively from the a-storing file 161, the b-storing file 162, the p-storing file 167, and the h-storing file 166, and operates according to the processing as shown in FIG. 5.

In Step S51 of FIG. 5, 127994587 that is the primitive 3rd power root of 1 with p=163255597 used as the divisor is stored in the variable $\zeta^3$, and 8342648 that is the primitive $7^{th}$ power root of 1 with p=163255597 used as the divisor is stored in the variable $\zeta_7$.

In Step S52 of FIG. 5, the following processing will be performed on the respective integers l=1, 2, 3 and the respective integers m=1, 2, 3, 4, 5, 6, 7.

When L=1 and m=1, $\zeta_3$=127994587 is stored in the variable $\epsilon$, and $\zeta_7$=8342648 is stored in the variable $\eta$. The random element $\{151707017+104678491\ x+123646083\ x^2+18753988\ y+87634493\ x^3+61274336\ x\ y+x^4, 138799785+145105684\ x+584395\ x^2+80828873\ y+34715892\ x^3+121885874\ x\ y+59787844\ x^4+x^2\ y, 161162224+117150097\ x+100956100\ x^2+89380061\ y+140032555\ x^3+43367019\ x\ y+y^2\}$ of the Jacobian group of an algebraic curve defined by the expression $\epsilon\ y^3+\eta\ x^7+1=127994587\ y^3+8342648\ x^7+1=0$ is generated, and this is stored in the variable G, the power of h=189342229290635176830764035532046510839791719442389 in the Jacobian group, on a point stored in the variable G is computed, and the result $\{133659497+103424746\ x+136032897\ x^2+131029199\ y+24618867\ x^3+114944034\ x\ y+x^4, 86125426+125891893x+19568269\ x^2+27044314y+80420960\ x^3+137562092\ x\ y+x^2\ y, 53604112+65990501\ x+51269221\ x^2+55271502\ y+7974233\ x^3+84922220\ x\ y+y^2\}$ is stored in the variable G.

Since the above content of the variable G is not equal to the identity element $\{\ \}$ in the Jacobian group, $\zeta_3$=127994587 is stored in the variable $\epsilon$, and $\zeta_7 8342648^2$ mod 163255597=159772073 is stored in the variable $\eta$, as for l=1 and m=2, thereby repeating the above processing.

In the case of the form of this embodiment, when l=2 and m=2, $\epsilon$=35261009 and $\eta$=159772073 are obtained, the power of h=189342229290635176830764035532046510839791719442389 on the point G=$\{4568071+141843715\ x+68256743\ x^2+71903501\ y+128953783\ x^3+10781960\ x\ y+x^4, 48272788+45615229\ x+150692034\ x^2+53973350\ y+11114765\ x^3+78550130\ x\ y+61331354\ x^4+x^2\ y, 117552807+135448907\ x+64074711\ x^2+141058974\ y+49208246\ x^3+93940317\ x\ y+y^2\}$ generated at random results in the identity element $\{\ \}$, and the parameter deciding device 15 supplies p=163255597, $\epsilon$=35261009, $\eta$=159772073 as the parameters of a secure algebraic curve.

Finally, the parameters p=163255597, $\epsilon$=35261009, $\eta$=159772073 supplied by the parameter deciding device 15 are supplied from the output device 18.

This time, the form of a second embodiment according to the present invention will be described in detail.

The form of the second embodiment according to the present invention is a secure parameter generating method in an algebraic curve cryptography, comprising:

(a) a Stickelberger element computing procedure of requiring the prime numbers a and b respectively from the a-storing file 161 and the b-storing file 162 and computing the Stickelberger element ω in the ab portion of the cyclotomic field;

(b) a procedure of storing the Stickelberger element ω computed in the above Stickelberger element computing procedure into the ω-storing file 163;

(c) a Jacobian addition candidate value computing procedure of requiring the prime number a, the prime number b, the size n of an encryption key, and the Stickelberger element ω respectively from the a-storing file 161, the b-storing file 162, the n-storing file 168, and ω-storing file 163 and computing the Jacobian addition candidate value j as for the two different prime numbers a and b and the prime number p corresponding to the Jacobian addition candidate value i;

(d) a procedure of storing the prime number p and the Jacobian addition candidate value j computed in the above Jacobian addition candidate value computing procedure, respectively into the p-storing file 167 and the j-storing file 164;

(e) an order candidate value computing procedure of requiring the prime number a, the prime number b, and the Jacobian candidate value j respectively from the a-storing file 161, the b-storing file 162, and the j-storing file 164 and computing the class H consisting of a plurality of candidate values for the order of the Jacobian group of the algebraic curve specified by the prime number a and the prime number b;

(f) a procedure of storing the class H computed in the above order candidate value computing procedure into the H-storing file 165;

(g) a security judging procedure of requiring the class H from the H-storing file 165 and searching for the candidate value h meeting the security condition such as almost prime number characteristic;

(h) a procedure of storing the candidate value h found in the above security judging procedure, into the h-storing file 166; and (i) a parameter deciding procedure of requiring the prime number a, the prime number b, the prime number p, and the candidate value h respectively from the a-storing file 161, the b-storing file 162, the p-storing file 167, and the h-storing file 166 and computing a parameter of an algebraic curve whose order of the Jacobian group is in accord with the candidate value h, of the algebraic curves specified by the prime number a, the prime number b, and the prime number p.

Figure 6:
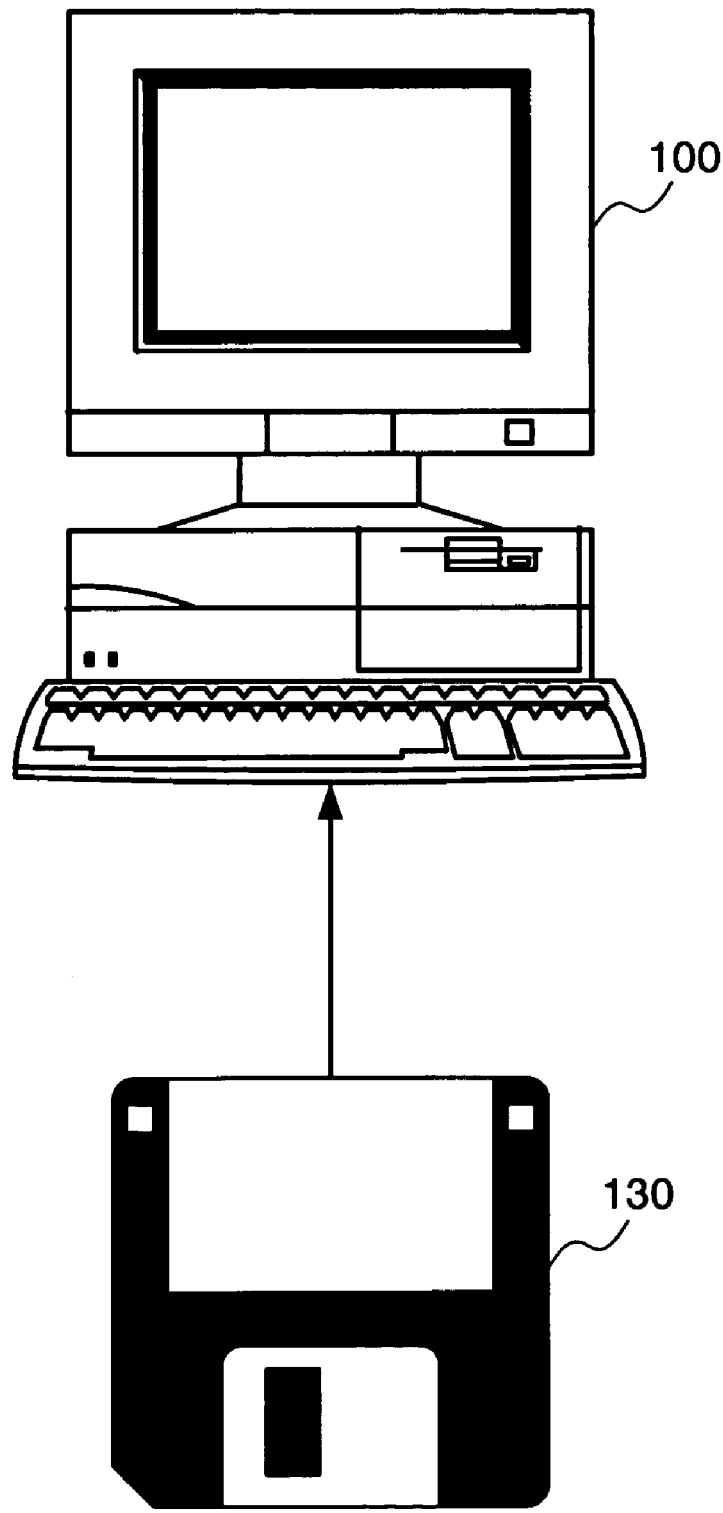
FIG. 6 is a block diagram showing the form of the third embodiment of the present invention.

The form of a third embodiment according to the present invention will be described in detail with reference to the drawings, this time. FIG. 6 is a block diagram showing the form of the third embodiment according to the present invention.

With reference to FIG. 6, the form of the third embodiment of the present invention is a storing medium 130 for storing a program for running the respective procedures according to the form of the second embodiment of the present invention, on a computer 100. This program is executed after being loaded in a storage of the computer 100.

The present invention is effective in enabling the use of a higher and complicated algebraic curve which couldn't be used, for an algebraic curve cryptography, and improving the security of the algebraic curve cryptography. This is because an algebraic curve having a prime number substantially as the order of the Jacobian group can be found efficiently from the class of algebraic curves having the following definition equation; $\alpha Y^a + \beta X^b + 1 = 0$, thereby expanding the range of the usable algebraic curves and dispersedly increasing the decoding work of a hacker.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A secure parameter generating device in an algebraic curve cryptography having the definition expression of $\alpha Y^a + \beta X^b + 1 = 0$, comprising:

an input means for receiving two different prime numbers (a, b) specifying degree of complexity of a curve and size (n) of an encryption key to be used;

a Stickelberger element computing devices for computing a Stickelberger element (ω) in an ab cyclotomic, based on the prime number (a) and the prime number (b);

a Jacobian addition candidate value computing device for computing Jacobian addition candidate value j corresponding to the two different prime numbers a and b, and a prime number p corresponding to the Jacobian addition candidate value j, based on the prime number (a), the prime number (b), the size (n) of an encryption key, and the Stickelberger element (ω);

an order candidate value computing device for computing a class H consisting of a plurality of candidate values for order of a Jacobian group of an algebraic curve specified by the prime number a and the prime number b, based on the prime number a, the prime number b, and the Jacobian addition candidate value j;

a security judging device for searching for a candidate value h meeting a security condition such as almost prime number characteristic from the class H, according to the class H;

a parameter deciding device for computing a parameter of an algebraic curve whose order of the Jacobian group is in accord with the candidate value h, of the algebraic curves specified by the prime number a, the prime number b, and the prime number p, based on the prime number a, the prime number b, the prime number p, and the candidate value h; and an output device for supplying the parameter of the algebraic curve computed by said parameter deciding device to an algebraic curve cryptographic public key system.

2. A secure parameter generating device in an algebraic curve cryptography having the definition expression of $\alpha Y^a + \beta X^b + 1 = 0$ as claimed in claim 1, further comprising:

an a-storing means, a b-storing means, and an n-storing means for respectively storing the prime number a, the prime number b, and the size n of the encryption key received by said input means;

a ω-storing means for storing a Stickelberger element ω computed by said Stickelberger element computing device;

a p-storing means and a i-storing means for respectively storing the prime number p and the Jacobian addition candidate value j computed by said Jacobian addition candidate value computing device;

an H-storing means for storing the class H computed by said order candidate value computing device; and an h-storing means for storing the candidate value h found by said security judging device.

3. A secure parameter generating device in an algebraic curve cryptography having the definition expression of $\alpha Y^a + \beta X^b + 1 = 0$ as claimed in claim 1, further comprising:

said Stickelberger element computing device for computing the Stickelberger element $\omega$ by use of the equation $\omega = \Sigma_t [<t/a> + <t/b>] \acute{o}\_\{-t^{-1}\}$ (where, t runs on a typical series of irreducible residue class with ab used as a divisor, $\lambda$ indicates the maximum integer not exceeding a rational number $\lambda$, $<\lambda>$ indicates a fractional portion $\lambda - [\lambda]$ of the rational number $\lambda$, $\acute{o}_t$ indicates Galois mapping $\zeta \to \zeta^t$ in the ab cyclotomic ($\zeta$ is the primitive ab root of 1)), based on the prime number a and the prime number b.

4. A secure parameter generating device in an algebraic curve cryptography having the definition expression of $\alpha Y^a + \beta X^b + 1 = 0$ as claimed in claim 1, further comprising:

said Jacobian addition candidate value computing device for generating $\alpha$ at random, which is an algebraic integer $\omega$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$.

5. A secure parameter generating device in an algebraic curve cryptography having the definition expression of $\alpha Y^a + \beta X^b + 1 = 0$ as claimed in claim 1, further comprising:

said Stickelberger element computing device for computing the Stickelberger element $\omega$ by use of the equation $\omega = \Sigma_t [<t/a> + <t/b>] \acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\acute{o}_t$ indicates Galois mapping $\zeta \to \zeta^t$ in the ab cyclotomic ($\zeta$ is the primitive ab root of 1)), based on the prime number a and the prime number b; and said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element o), and computing the Jacobian addition candidate value j by use of the equation $j = \gamma^\omega$.

6. A secure parameter generating device in an algebraic curve cryptography having the definition expression of $\alpha Y^a + \beta X^b + 1 = 0$ as claimed in claim 1, further comprising:
said order candidate value computing device for computing a candidate value $h_k$ for the order of the Jacobian group of an algebraic curve specified by the parameters a and b, using the equation $h_k = \text{Norm}_{K|Q}(1 + (-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$.

7. A secure parameter generating device in an algebraic curve cryptography having the definition expression of $\alpha Y^a + \beta X^b + 1 = 0$ as claimed in claim 1, further comprising:

said Stickelberger element computing device for computing the Stickelberger element $\omega$ by use of the equation $\omega = \Sigma_t [<t/a> + <t/b>] \acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\acute{o}_t$ indicates Galois mapping $\zeta \to \zeta^t$ in the ab cyclotomic ($\zeta$ is the primitive ab root of 1)), based on the prime number a and the prime number b; and said order candidate value computing device for computing a candidate value $h_k$ for the order of the Jacobian group of an algebraic curve specified by the parameters a and b, using the equation $h_k = \text{Norm}_{K|Q}(1 + (-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$.

8. A secure parameter generating device in an algebraic curve cryptography having the definition expression of $\alpha Y^a + \beta X^b + 1 = 0$ as claimed in claim 1, further comprising:

said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j = \gamma^\omega$; and said order candidate value computing device for computing a candidate value $h_k$ for the order of the Jacobian group of an algebraic curve specified by the parameters a and b, using the equation $h_k = \text{Norm}_{K|Q}(1 + (-\zeta)^k j)$ (where Norm_{K|Q} is a norm mapping in the ab cyclotomic K), as for each k that is an integer from 1 to 2ab inclusively, based on the prime number a, the prime number b, and the Jacobian addition candidate value j, and computing the class of the candidate values, $H = \{h_1, h_2, \ldots, h_{2ab}\}$.

9. A secure parameter generating device in an algebraic curve cryptography having the definition expression of $\alpha Y^a + \beta X^b + 1 = 0$ as claimed in claim 1, further comprising:

said Stickelberger element computing device for computing the Stickelberger element $\omega$ by use of the equation $\omega = \Sigma_t [<t/a> + <t/b>] \acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda - [\lambda]$ of the rational number $\lambda$, $\acute{o}_t$ indicates Galois mapping $\zeta \to \zeta^t$ in the ab cyclotomic ($\zeta$ is the primitive ab root of 1)), based on the prime number a and the prime number b;

said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$; and said order candidate value computing device for computing a candidate value $h_k$ for the order of the Jacobian group of an algebraic curve specified by the parameters a and b, using the equation $h_k=\text{Norm}_{K|Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$.

10. A secure parameter generating device in an algebraic curve cryptography having the definition expression of $\alpha Y^a+\beta X^b+1=0$ as claimed in claim 1, further comprising:

said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1 Y_a + \zeta_b^m X^b+1=0$, as for each integer 1 from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

11. A secure parameter generating device in an algebraic curve cryptography having the definition expression of $\alpha Y^a+\beta X^b+1=0$ as claimed in claim 1, further comprising:

said Stickelberger element computing device for computing the Stickelberger element $\omega$ by use of the equation $\omega=\Sigma_t[<t/a>+<t/b>]ó\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $ó_t$ indicates Galois mapping $\zeta\rightarrow\zeta^t$ in the ab cyclotomic ($\zeta$ is the primitive ab root of 1)), based on the prime number a and the prime number b; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

12. A secure parameter generating device in an algebraic curve cryptography having the definition expression of $\alpha Y^a+\beta X^b+1=0$ as claimed in claim 1, further comprising:

said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length $2n/(a-1)(b-1)$ or so, based on the prime number a, the prime number b, the size n of the encryption key, and the Stickelberger element $\omega$, and computing the Jacobian addition candidate value j by use of the equation $j=\gamma^\omega$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

13. A secure parameter generating device in an algebraic curve cryptography having the definition expression of $\alpha Y^a+\beta X^b+1=0$ as claimed in claim 1, further comprising:

said order candidate value computing device for computing a candidate value $h_k$ for the order of the Jacobian group of an algebraic curve specified by the parameters a and b, using the equation $h_k=\text{Norm}_{K|Q}(1+(-\zeta)^k j)$ (where Norm_{K|Q}, is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

14. A secure parameter generating device in an algebraic curve cryptography having the definition expression of $\alpha Y^a+\zeta X^b+1=0$ as claimed in claim 1, further comprising:

said Stickelberger element computing device for computing the Stickelberger element $\omega$ by use of the equation $\omega=\Sigma_t[<t/a>+<t/b>]ó\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $ó_t$ indicates Galois mapping $\zeta\rightarrow\zeta^t$ in the ab cyclotomic ($\zeta$ is the primitive ab root of 1)), based on the prime number a and the prime number b;

said Jacobian addition candidate value computing device for generating $\alpha$ at random, which is an algebraic integer $\gamma$ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j=\gamma^{\omega}$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

15. A secure parameter generating device in an algebraic curve cryptography having the definition expression of $\alpha Y^a+\beta X^b+1=0$ as claimed in claim 1, further comprising:

said Stickelberger element computing device for computing the Stickelberger element ω by use of the equation $\omega=\Sigma_t[<t/a>+<t/b>]\acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] f the rational number λ, $\acute{o}_t$ indicates Galois mapping $\zeta \to \zeta^t$ in the ab cyclotomic (ζ is the primitive ab root of 1)), based on the prime number a and the prime number b;

said order candidate value computing device for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

16. A secure parameter generating device in an algebraic curve cryptography having the definition expression of $\alpha Y^a+\beta X^b+1=0$ as claimed in claim 1, further comprising:

said Jacobian addition candidate value computing device for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element co, and computing the Jacobian addition candidate value j by use of the equation $j=\gamma^{\omega}$;

said order candidate value computing device for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

17. A secure parameter generating device in an algebraic curve cryptography having the definition expression of $\alpha Y^a+\beta X^b+1=0$ as claimed in claim 1, further comprising:

said Stickelberger element computing device for computing the Stickelberger element ω by use of the equation $\omega=\Sigma_t[<t/a>+<t/b>]\acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \to \zeta^t$ in the ab cyclotomic (ζ is the primitive ab root of 1)), based on the prime number a and the prime number b;

said Jacobian addition candidate value computing device for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element c, and computing the Jacobian addition candidate value j by use of the equation $j=\gamma^{\omega}$;

said order candidate value computing device for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding device for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a + \zeta_b^m X^b + 1 = 0$, as for each integer 1 from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

18. A secure parameter generating method in an algebraic curve cryptography having the definitions expression of $\alpha Y^a + \beta X^b + 1 = 0$, comprising the steps of:

a Stickelberger element computing procedure for computing a Stickelberger element ω in an ab cyclotomic, respectively based on two different prime numbers a and b specifying degree of complexity of curve;

a Jacobian addition candidate value computing, procedure for computing Jacobian addition candidate value j corresponding to the two different prime numbers a and b, and a prime number p corresponding to the Jacobian addition candidate value j, respectively based on the prime number a, the prime number b, the size n of an encryption key, and the Stickelberger element ω;

an order candidate value computing procedure for computing a class H consisting of a plurality of candidate values for order of a Jacobian group of an algebraic curve specified by the prime number a and the prime number b, respectively based on the prime number a, the prime number b, and the Jacobian addition candidate value j;

a security judging procedure for searching for a candidate value h meeting a security condition such as almost prime number characteristic from the class H, according to the class H; and a parameter deciding procedure for computing a parameter of an algebraic curve whose order of the Jacobian group is in accord with the candidate value h, of the algebraic curves specified by the prime number a, the prime number b, and the prime number p, respectively based on the prime number a, the prime number b the prime number p, and the, candidate value h; and supplying said parameter to an algebraic curve cryptographic public key system.

19. A secure parameter generating method in an algebraic curve cryptography having the definition expression of $\alpha Y^a + \beta X^b + 1 = 0$ as claimed in claim 18, further comprising:

a procedure for storing a Stickelberger element o computed by said Stickelberger element computing procedure into said ω-storing means;

a procedure for respectively storing the prime number p and the Jacobian addition candidate value j computed by said Jacobian addition candidate value computing procedure into said p-storing means and j-storing means;

a procedure for storing the class H computed by said order candidate value computing procedure into said H-storing means; and a procedure for storing the candidate value h found by said security judging procedure into said h-storing means.

20. A secure parameter generating method in an algebraic curve cryptography having the definition expression of $\alpha Y^a + \beta X^b + 1 = 0$ as claimed in claim 18, further comprising:

said Stickelberger element computing procedure for computing the Stickelberger element ω by use of the equation $\omega = \Sigma_t [<t/a> + <t/b>] \acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \rightarrow \zeta^t$ in the ab cyclotomic (ζ is the primitive ab root of 1)), based on the prime number a and the prime number b.

21. A secure parameter generating method in an algebraic curve cryptography having the definition expression of $\alpha Y^a + \beta X^b + 1 = 0$ as claimed in claim 18, further comprising:

said Jacobian addition candidate value computing procedure for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element c, and computing the Jacobian addition candidate value j by use of the equation $j = \gamma^\omega$.

22. A secure parameter generating method in an algebraic curve cryptography having the definition expression of $\alpha Y^a + \beta X^b + 1 = 0$ as claimed in claim 18, further comprising:

said Stickelberger element computing procedure for computing the Stickelberger element ω by use of the equation $\omega = \Sigma_t [<t/a> + <t/b>] \acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \rightarrow \zeta^t$ in the ab cyclotomic (ζ is the primitive ab root of 1)), based on the prime number a and the prime number b; and said Jacobian addition candidate value computing procedure for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j = \gamma^\omega$.

23. A secure parameter generating method in an algebraic curve cryptography having the definition expression of $\alpha Y^a + \beta X^b + 1 = 0$ as claimed in claim 18, further comprising:

said order candidate value computing procedure for computing a candidate value $h_k$ for the order of the Jacobian group of an algebraic curve specified by the parameters a and b, using the equation $h_k = \text{Norm}_{K/Q}(1 + (-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H = \{h_1, h_2, \ldots, h_{2ab}\}$.

24. A secure parameter generating method in an algebraic curve cryptography having the definition expression of $\alpha Y^a + \beta X^b + 1 = 0$ as claimed in claim 18, further comprising:

said Stickelberger element computing procedure for computing the Stickelberger element ω by use of the equation $\omega=\Sigma_t[<t/a>+<t/b>]\acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\acute{o}_t$ indicates Galois mapping $\zeta\to\zeta^t$ in the ab cyclotomic ($\zeta$ is the primitive ab root of 1)), based on the prime number a and the prime number b; and said order candidate value computing procedure for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$.

25. A secure parameter generating method in an algebraic curve cryptography having the definition expression of $\alpha Y^a+\beta X^b+1=0$ as claimed in claim 18, further comprising:

said Jacobian addition candidate value computing procedure for generating $\alpha$ at random, which is an algebraic integer 1 generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element co, and computing the Jacobian addition candidate value j by use of the equation $j=\gamma^\omega$; and said order candidate value computing procedure for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$.

26. A secure parameter generating method in an algebraic curve cryptography having the definition expression of $\alpha Y^a+\beta X^b+1=0$ as claimed in claim 18, further comprising:

said Stickelberger element computing procedure for computing the Stickelberger element $\omega$ by use of the equation $\omega=\Sigma_t[<t/a>+<t/b>]\acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\acute{o}_t$ indicates Galois mapping $\zeta\to\zeta^t$ in the ab cyclotomic ($\zeta$ is the primitive ab root of 1)), based on the prime number a and the prime number b;

said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element 0), and computing the Jacobian addition candidate value j by use of the equation $j=\gamma^\omega$; and said order candidate value computing procedure for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$.

27. A secure parameter generating method in an algebraic curve cryptography having the definition expression of $\alpha Y^a+\beta X^b+1=0$ as claimed in claim 18, further comprising:

said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing $\zeta$ the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

28. A secure parameter generating method in an algebraic curve cryptography having the definition expression of $\alpha Y^a+\beta X^b+1=0$ as claimed in claim 18, further comprising:

said Stickelberger element computing procedure for computing the Stickelberger element $\omega$ by use of the equation $\omega=\Sigma_t[<t/a>+<t/b>]\acute{o}\_\{-t^{-1}\}$ (where, t runs on a typical series of irreducible residue class with ab used as a divisor, $[\lambda]$ indicates the maximum integer not exceeding a rational number $\lambda$, $<\lambda>$ indicates a fractional portion $\lambda-[\lambda]$ of the rational number $\lambda$, $\acute{o}_t$ indicates Galois mapping $\zeta\to\zeta^t$ in the ab cyclotomic ($\zeta$ is the primitive ab root of 1)), based on the prime number a and the prime number b; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a+\zeta_b^m X^b+1=0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

29. A secure parameter generating method in an algebraic curve cryptography having the definition expression of $\alpha Y^a+\beta X^b+1=0$ as claimed in claim 18, further comprising:

said Jacobian addition candidate value computing procedure for generating $\alpha$ at random, which is an algebraic integer $\gamma$ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element $\omega$, and computing the Jacobian addition candidate value j by use of the equation $j=\gamma^\omega$; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a + \zeta_b^m X^b + 1 = 0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

30. A secure parameter generating method in an algebraic curve cryptography having the definition expression of $\alpha Y^a + \beta X^b + 1 = 0$ as claimed in claim 18, further comprising:

said order candidate value computing procedure for computing a candidate value $h_k$ for the order of the Jacobian group of an algebraic curve specified by the parameters a and b, using the equation $h_k = \text{Norm}_{K/Q}(1 + (-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a + \zeta_b^m X^b + 1 = 0$, as for each integer 1 from 1 to a inclusively and each integer in from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

31. A secure parameter generating method in an algebraic curve cryptography having the definition expression of $\alpha Y^a + \beta X^b + 1 = 0$ as claimed in claim 18, further comprising: said Stickelberger element computing procedure for computing the Stickelberger element $\omega$ by use of the equation $\omega = \Sigma_t [<t/a> + <t/b>] \acute{o}_{-}\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \to \zeta^t$ in the ab cyclotomic ($\zeta$ is the primitive ab root of 1)), based on the prime number a and the prime number b;

said Jacobian addition candidate value computing procedure for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j = \gamma^\omega$; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a + \zeta_b^m X^b + 1 = 0$, as for each integer 1 from 1 to a inclusively and each integer m from 1 to b inclusively, computing the h-fold of an element in the Jacobian group indicated by the point G, and supplying p, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

32. A secure parameter generating method in an algebraic curve cryptography having the definition expression of $\alpha Y^a + \beta X^b + 1 = 0$ as claimed in claim 18, further comprising:

said Stickelberger element computing procedure for computing the Stickelberger element $\omega$ by use of the equation $\omega = \Sigma_t [<t/a> + <t/b>] \acute{o}_{-}\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \to \zeta^t$ in the ab cyclotomic ($\zeta$ is the primitive ab root of 1)), based on the prime number a and the prime number b;

said order candidate value computing procedure for computing a candidate value $h_k$ for the order of the Jacobian group of an algebraic curve specified by the parameters a and b, using the equation $h_k = \text{Norm}_{K/Q}(1 + (-\zeta)_k j)$ (where Norm{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H = \{h_1, h_2, \ldots, h_{2ab}\}$; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^1$, $Y^a + \zeta_b^m X^b + 1 = 0$, as for each integer 1 from 1 to a inclusively and each integer in from 1 to b inclusively, computing the h-fold of an element in the Jacobian group indicated by the point G, and supplying P, $\zeta_a^1$, and $\zeta_b^m$ as the parameter of an algebraic curve whose order of the Jacobian group is in accord with the candidate value h, of the algebraic curves specified by the prime number a and the prime number b if the result is equal to an identity element in the Jacobian group.

33. A secure parameter generating method in an algebraic curve cryptography having the definition expression of $\alpha Y^a + \beta X^b + 1 = 0$ as claimed in claim 18, further comprising:

said Jacobian addition candidate value computing procedure for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element c, and computing the Jacobian addition candidate value j by use of the equation $j = \gamma^\omega$; said order candidate value computing procedure for computing a candidate value $h_k$ for the order of the Jacobian group of an algebraic curve specified by the parameters a and b, using the equation $h_k=\text{Nomr}_{K/Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding procedure for requiring the primitive a root $\zeta_a$ and the primitive b root $\zeta_b$ of 1 with the prime number p used as the divisor, based on the prime number a, the prime number b, the prime number Pi and the candidate value h, generating a random point G over an algebraic curve defined by the equation $\zeta_a^{\ 1}$, $Y^a+\zeta_b^{\ m}X^b+1=0$, as for each integer 1 from 1 to a inclusively and each integer in from 1 to b inclusively, computing the h-fold of an element in the Jacobian group indicated by the point G, and supplying p, $\zeta_a^{\ 1}$, and $\zeta_b^{\ m}$ as the parameter of an algebraic curve whose order of the Jacobian group is in accord with the candidate value h, of the algebraic curves specified by the prime number a and the prime number b if the result is equal to an identity element in the Jacobian group.

34. A secure parameter generating method in an algebraic curve cryptography having the definition expression of $\alpha Y^a+\beta X^b+1=0$ as claimed in claim 18, further comprising:

said Stickelberger element computing procedure for computing the Stickelberger element ω by use of the equation $\omega=\Sigma_t[<t/a>+<t/b>]\acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \to \zeta^t$ in the ab cyclotomic (ζ is the primitive ab root of 1)), based on the prime number a and the prime number b;

said Jacobian addition candidate value computing procedure for generating α at random, which is an algebraic integer 1 generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j=\gamma^\omega$;

said order candidate value computing procedure for computing a candidate value $h_k$ for the order of the Jacobian group of an algebraic curve specified by the parameters a and b, using the equation $h_k=\text{Norm}_{K/Q}(1+(-\zeta)^k j)$ (where Norm_{K|Q} is a norm mapping in the ab cyclotomic K), as for each k that is an integer from 1 to 2ab inclusively, when $\zeta$ is the primitive ab root of 1, based on the prime number a, the prime number b, and the Jacobian addition candidate value j, and computing the class of the candidate values, $H=\{h_1,h_2,\ldots,h_{2ab}\}$; and said parameter deciding procedure for requiring the primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^{\ 1}$, $Y^a+\zeta_b^{\ m}X^b+1=0$, as for each integer 1 from 1 to a inclusively and each integer in from 1 to b inclusively, computing the h-fold of an element in the Jacobian group indicated by the point G, and supplying P, $\zeta_a^{\ 1}$, and $\zeta_b^{\ m}$ as the parameter of an algebraic curve whose order of the Jacobian group is in accord with the candidate value h, of the algebraic curves specified by the prime number a and the prime number b if the result is equal to an identity element in the Jacobian group.

35. A computer readable memory storing a program for generating a secure parameter in an algebraic curve cryptography having the definition expression of $\alpha Y^a+\beta X^b+1=0$, which, when executing on a computer causes the computer to carry out the steps comprising:

a Stickelberger element computing procedure for computing a Stickelberger element co in an ab cyclotomic, respectively based on two different prime numbers a and b specifying degree of complexity of curve;

a Jacobian addition candidate value computing procedure for computing Jacobian addition candidate value j corresponding to the two different prime numbers a and b, and a prime number p corresponding to the Jacobian addition candidate value j, respectively based on the prime number a, the prime number b, the size n of an encryption key, and the Stickelberger element ω;

an order candidate value computing procedure for computing a class H consisting of a plurality of candidate values for order of a Jacobian group of an algebraic curve specified by the prime number a and the prime number b, respectively based on the prime number a, the prime number b, and the Jacobian addition candidate value j;

a security judging procedure for searching for a candidate value h meeting a security condition such as almost prime number characteristic from the class H, according to the class H; and a parameter deciding procedure for computing a parameter of an algebraic curve whose order of the Jacobian group is in accord with the candidate value h, of the algebraic curves specified by the prime number a, the prime number b, and the prime number p, respectively based on the prime number a, the prime number b, the prime number p, and the candidate value h.

36. A computer readable memory storing a program for generating a secure parameter in an algebraic curve cryptography having the definition expression of $\alpha Y^a+\beta X^b+1=0$, which, when executing on a computer causes the computer to carry out the steps comprising:

a Stickelberger element computing procedure for computing the Stickelberger element ωby use of the equation $\omega=\Sigma_t[<t/a>+<t/b>]\acute{o}\_\{-t^{-1}\}$ (where, t runs on a typical series of irreducible residue class with ab used as a divisor, [λ] indicates the maximum integer not exceeding a rational number λ, <λ> indicates a fractional portion λ−[λ] of the rational number λ, $\acute{o}_t$ indicates Galois mapping $\zeta \to \zeta^t$ in the ab cyclotomic (ζ is the primitive ab root of 1)), based on the prime number a and the prime number b.

37. A computer readable memory storing a program for generating a secure parameter in an algebraic curve cryptography having the definition expression of $\alpha Y^a+\beta X^b+1=0$, which, when executing on a computer causes the computer to carry out the steps comprising:

a Jacobian addition candidate value computing procedure for generating α at random, which is an algebraic integer γ generating a prime ideal of a cyclotomic K generated by the primitive ab root of 1 and whose absolute norm becomes the prime number p of bit length 2n/(a−1)(b−1) or so, based on the prime number a, the prime number b, the size n of the encryption key, and the Stickelberger element ω, and computing the Jacobian addition candidate value j by use of the equation $j=\gamma^{\omega}$.

38. A computer readable memory storing a program for generating a secure parameter in an algebraic curve cryptography having the definition expression of $\alpha Y^a + \beta X^b + 1 = 0$, which, when executing on a computer causes the computer to carry out the steps comprising:

an order candidate value computing procedure for computing a candidate value $h_k$ for the order of the Jacobian group of an algebraic curve specified by the parameters a and b, using the equation $h_k = \text{Norm}_{K/Q}(1+(-\zeta)^k j)$ (where Norm_{K|Q} is a norm mapping in the ab cyclotomic K), as for each k that is an integer from 1 to 2ab inclusively, when ζ is the primitive ab root of 1, based on the prime number a, the prime number b, and the Jacobian addition candidate value j, and computing the class of the candidate values, $H = \{h_1, h_2, \ldots, h_{2ab}\}$.

39. A computer readable memory storing a program for generating a secure parameter in an algebraic curve cryptography having the definition expression of $\alpha Y^a + \beta X^b + 1 = 0$, which, when executing on a computer causes the computer to carry out the steps comprising:

a parameter deciding procedure for requiring he primitive a root $\zeta_a$ and the primitive b root $\zeta_b$ of 1 with the prime number p used as the divisor, based on the prime number a, the prime number b, the prime number p, and the candidate value h, generating a random point G over an algebraic curve defined by the equation $\zeta_a^{\ 1}$, $Y^a + \zeta_b^{\ m} X^b + 1 = 0$, as for each integer 1 from 1 to a inclusively and each integer in from 1 to b inclusively, computing the h-fold of an element in the Jacobian group indicated by the point G, and supplying p, $\zeta_a^{\ 1}$, and $\zeta_b^{\ m}$ as the parameter of an algebraic curve whose order of the Jacobian group is in accord with the candidate value h, of the algebraic curves specified by the prime number a and the prime number b if the result is equal to an identity element in the Jacobian group.

* * * * *